F. Hamblin,

Churn.

No. 99,312. Patented Feb. 1, 1870.

United States Patent Office.

FLOYD HAMBLIN, OF MADRID SPRINGS, NEW YORK.

Letters Patent No. 99,312, dated February 1, 1870.

IMPROVEMENT IN CHURNS.

The Schedule referred to in these Letters Patent and making part of the same.

*To all whom it may concern:*

Be it known that I, FLOYD HAMBLIN, of Madrid Springs, in the county of St. Lawrence, and State of New York, have invented a new and useful Improvement in Churns; and I do hereby declare that the following is a full, clear, and exact description thereof, which will enable others skilled in the art to make and use the same, reference being had to the accompanying drawings, forming part of this specification.

This invention relates to improvements in churns, and consists in the arrangement, on a horizontal shaft, within a suitable case, of two or more rows of scoop or cup-shaped paddles, in spiral lines, in opposite directions around the shaft, and, in connection therewith, a series of parallel cream-breaking bars, around the space above the paddles, against which bars the cream taken up by the paddles will be thrown, with sufficient violence to break the small particles, whereby the formation of the butter will be accelerated.

The object of the scoop or cup-form of the paddles is, besides the advantage of the greater agitation which they impart, to force the air into the cream in a greater measure, which I find, in practice, to be the case; and the object of the arrangement of the spiral lines in opposite direction is to impart a forcible movement of the cream, from end to end of the churn, at the same time that the agitation due to the movement in the direction of the rotation is going on.

Figure 1:
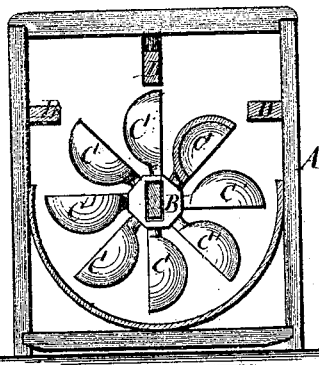
Figure 2:
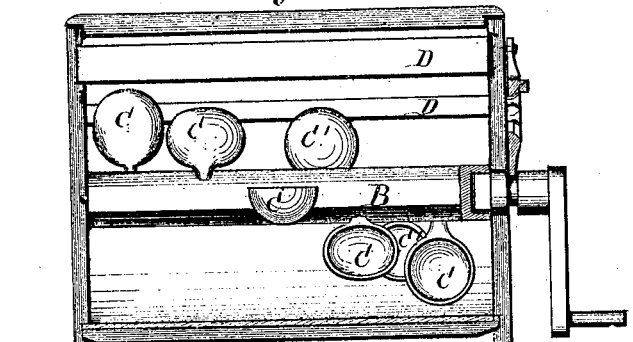

Figure 1 is a cross-section through my improved churn, taken on the line $x\ x$ of fig. 2, and Figure 2 is a longitudinal sectional elevation of the same.

Similar letters of reference indicate corresponding parts.

The case A may be of any approved construction and arrangement, for the reception of a horizontal shaft, B, for the application of rotary paddles.

C C' represent paddles, which I propose to make in the scoop or cup-shape represented in the drawings, for the purpose of imparting greater agitation, carrying the cream up and on the top, dashing it against the sides of the case and the bars D, and for forcing the air into more direct contact with the cream, which I find to be the case by practical experiment.

I arrange these paddles in two or more spiral lines around the shaft, pitching each alternate line in the opposite direction, so as to effect a strong movement of the cream from end to end of the case, whereby the agitation is much more intense than when the rotary motion only is imparted.

The bars D, which I arrange in the space above the paddles, parallel with the shaft B, are also important adjuncts to the paddles, for agitating the cream.

Having thus described my invention,

I claim as new, and desire to secure by Letters Patent—

1. The arrangement of the scoop or cup-shaped paddles, in two or more spiral lines, around the shaft, alternately opposed to each other in the direction of the pitch, substantially as specified.

2. The combination, with the shaft and paddles, of the parallel bars D, substantially as specified.

FLOYD HAMBLIN.

Witnesses:
GEO. P. BUCK,
C. A. CHANDLER.